United States Patent
Chen et al.

(10) Patent No.: US 7,288,425 B2
(45) Date of Patent: Oct. 30, 2007

(54) HYBRID CANTILEVER AND TIP

(75) Inventors: Chien-Hua Chen, Corvallis, OR (US); James McKinnell, Salem, OR (US); Chris Beatty, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 10/915,571

(22) Filed: Aug. 11, 2004

(65) Prior Publication Data
US 2006/0044983 A1    Mar. 2, 2006

(51) Int. Cl.
H01L 21/00    (2006.01)

(52) U.S. Cl. ......................... 438/52; 438/425

(58) Field of Classification Search .................. None
See application file for complete search history.

(56) References Cited

U.S. PATENT DOCUMENTS

| | | | | |
|---|---|---|---|---|
| 5,021,364 A | * | 6/1991 | Akamine et al. | 250/306 |
| 5,066,358 A | * | 11/1991 | Quate et al. | 216/2 |
| 5,811,017 A | * | 9/1998 | Matsuyama | 216/11 |
| 5,936,237 A | * | 8/1999 | van der Weide | 250/234 |
| 5,959,957 A | * | 9/1999 | Ikeda et al. | 369/127 |
| 6,277,703 B1 | * | 8/2001 | Barlocchi et al. | 438/412 |

* cited by examiner

Primary Examiner—Thang V. Tran
Assistant Examiner—Peter Vincent Agustin

(57) ABSTRACT

A storage device having a read/write mechanism including a cantilever portion. The cantilever portion includes a non-single-crystal silicon body portion and a single crystal silicon tip.

13 Claims, 10 Drawing Sheets

HYBRID CANTILEVER AND TIP

BACKGROUND

Information storage media are capable of storing information in electronic form. In one respect, the information storage media may be part of a storage device having some type of read and write mechanism for reading information from the media and writing information to the media, respectively.

The storage device may read information stored in storage media by positioning its read mechanism relative to the location on the media where the information is stored. To store information, the storage device may position its write mechanism relative to the location on the media where the information is to be written, and cause the information to be stored. For example, a read/write mechanism can include a probe having a cantilever and some type of tip for reading and writing information to and from a storage media, respectively.

Typically, a cantilever tip used to read and write information may be formed using a non-single crystal silicon material, such as amorphous silicon or polycrystalline silicon ("poly-silicon"). Amorphous silicon refers to the non-crystalline form of silicon. The thickness of the non-single crystal silicon may be controlled in a relatively precise manner. Poly-silicon refers to silicon made up of crystalline sections randomly connected to form a solid material. Both amorphous silicon and polycrystalline silicon can also be deposited using low pressure chemical vapor deposition ("LPCVD"). However, it is extremely difficult, if not impossible, to consistently produce a very sharp tip out of non-single crystal silicon as compared with single crystal silicon.

It would thus be desirable to have a relatively simple and inexpensive process for producing relatively sharp tips for use on information storage media.

SUMMARY

A storage device includes a read/write mechanism having a cantilever portion. The cantilever portion includes a non-single-crystal silicon body portion and a single crystal silicon tip.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

A read/write mechanism for a storage device includes a non-single crystal silicon cantilever portion and a single crystal tip extending from a substantially distal end of the cantilever portion. A technique for forming the read/write mechanism includes forming a single crystal silicon tip in a silicon wafer, depositing a non-single crystal silicon layer over a substantially horizontal area of the silicon wafer, the non-single crystal silicon layer surrounding the single crystal silicon tip, and cavity etching the silicon that remains exposed to form a cantilever portion, as will be described in more detail below. The technique also includes sharpening the single-crystal silicon tip during the cavity etching step.

A cantilever tip may be formed using a silicon-on-insulator ("SOI") wafer. A SOI wafer is used to form a single crystal silicon tip and a single crystal silicon cantilever layer. The single crystal nature of the tip generally allows the tip to be relatively sharp.

Figure 1:
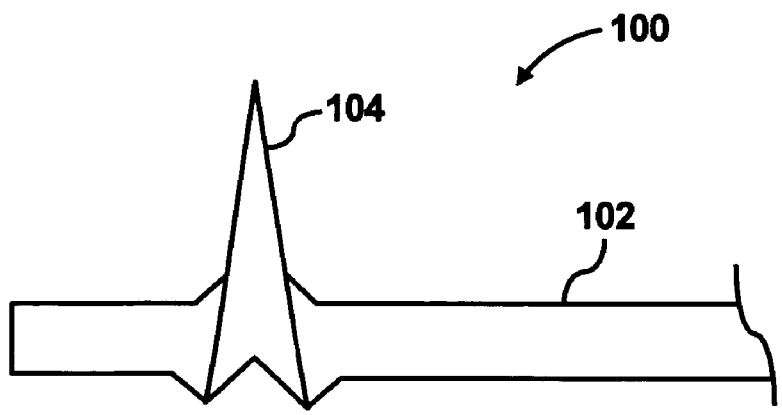
FIG. 1 illustrates a cantilever portion of a read/write mechanism according to an embodiment of the invention.

Referring to FIG. 1, a cantilever read/write mechanism 100 is shown. The read/write mechanism 100 may be used to read data from and write data to a storage medium (not shown). The read/write mechanism 100 includes a cantilever portion 102 and a tip portion 104 extending from the cantilever portion. The cantilever portion 102 includes a non-single crystal silicon material, such as amorphous silicon or poly-silicon. The tip portion 104 includes a single crystal silicon material.

The read/write mechanism 100 may include, for example, a probe in an atomic resolution storage ("ARS") system. The tip portion 104 of the read/write mechanism 100 may be used to write data bits in a storage medium, such as, for example, a polymer film. The read/write mechanism may write data bits onto the polymer by heating the tip 104, which generally causes the polymer to form a dimple in the storage medium. In this regard, the dimples may represent the data bits. The tip 104 may then read the data bits by reading the dimples. That is, the dimples may be read by traversing the tip 104 over the storage medium and determining that a dimple is present when the tip 104 becomes inserted into the dimple. In addition, application of sufficient heat through the tip 104 to remove the dimple may be used to erase the data bits in the storage medium.

Figure 2A:
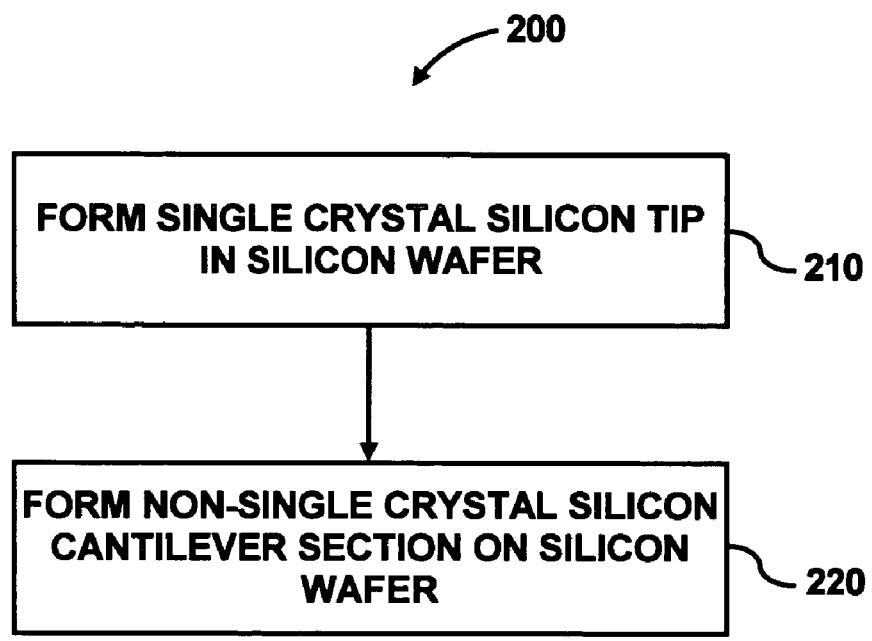
FIG. 2A is a flow diagram illustrating an operational mode for forming a read/write mechanism for a storage device, according to an embodiment of the invention.

FIG. 2A is a flow diagram illustrating an operational mode 200 of a method for forming a read/write mechanism. It is to be understood that the following description of the operational mode 200 is but one manner of a variety of different manners in which a method for forming a read/write mechanism may be practiced. It should also be apparent to those of ordinary skill in the art that the operational mode 200 represents a generalized illustration and that other steps may be added or existing steps may be removed, modified or rearranged without departing from the scope of the operational mode 200.

The description of the operational mode 200 is made with reference to FIG. 1 and FIGS. 3A-3R (below), and thus makes reference to the elements cited therein. It should, however, be understood that the operational mode 200 is not limited to the elements set forth in FIGS. 1 and 3A-3R. Instead, it should be understood that the operational mode 200 may be practiced by a read/write mechanism forming process having a different configuration than that set forth in FIGS. 1 and 3A-3R, and may produce a read/write mechanism having a different configuration than that set forth in FIGS. 1 and 3A-3R.

The operational mode 200 may be initiated or started as indicated at step 210. The initiation of the operational mode 200 may include forming a single crystal silicon tip 104 in a silicon wafer. At step 220, the operational mode 200 further includes forming a non-single crystal silicon cantilever section 102 on the silicon wafer.

The order of the steps described in operational mode 200 may be performed in any order or simultaneously. For example, formation of the single crystal silicon tip 104 may be completed substantially simultaneously with the formation of the cantilever section 102.

Figure 2B:
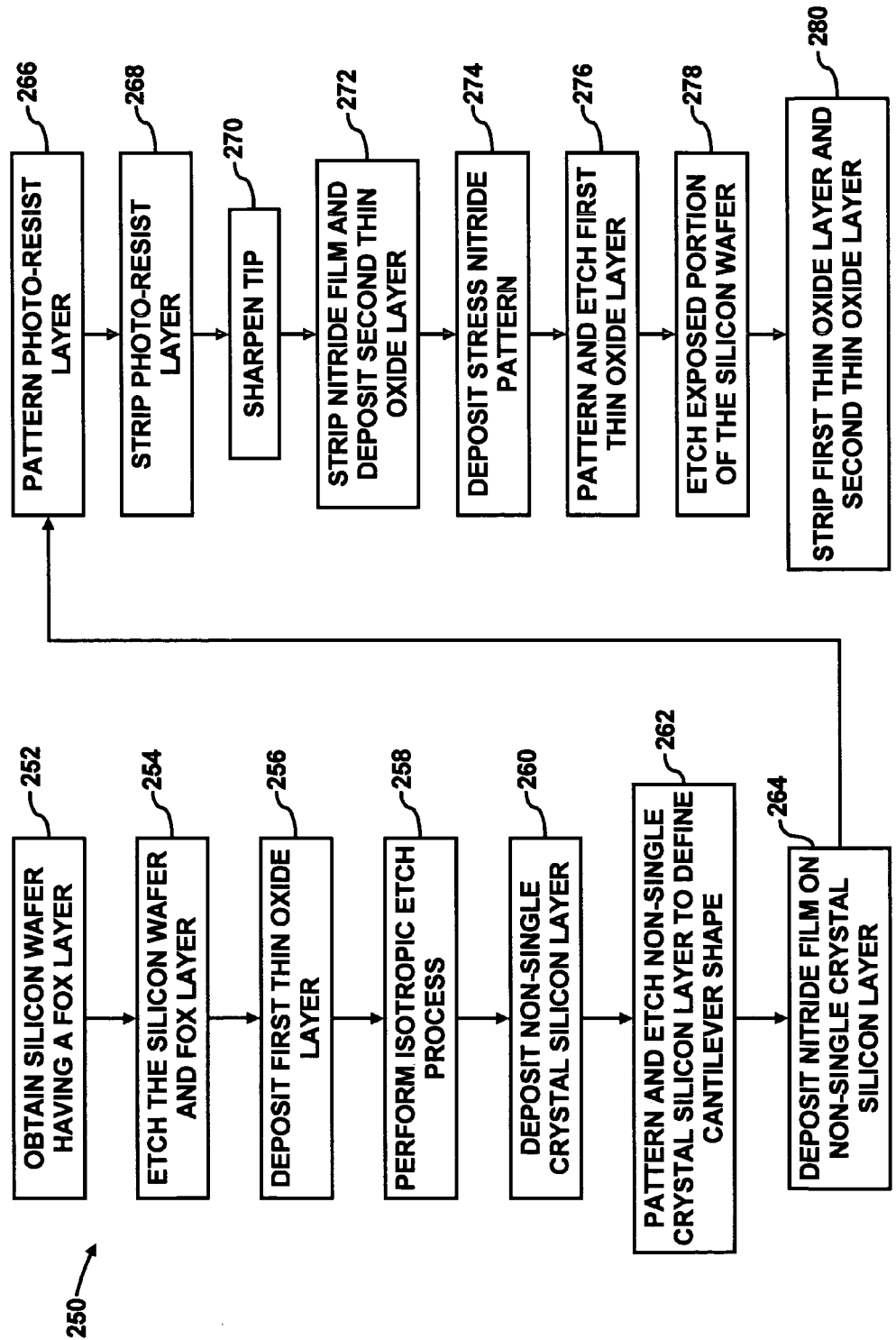
FIG. 2B is a flow diagram, which depicts in greater detail the operational mode for forming the read/write mechanism shown in FIG. 2A.
Figure 3A:
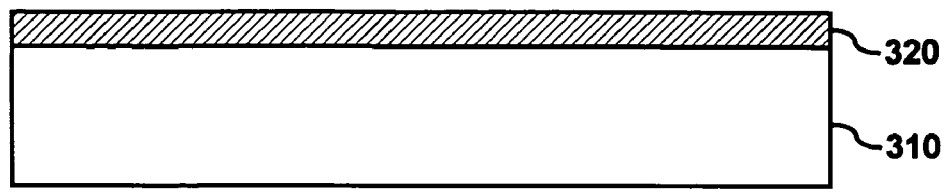
FIGS. 3A-3R illustrate different stages in forming a read/write mechanism, according to an embodiment of the invention.
Figure 3B:
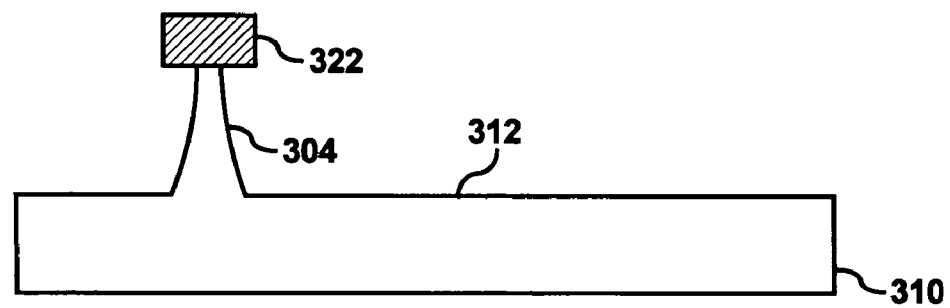
Figure 3C:
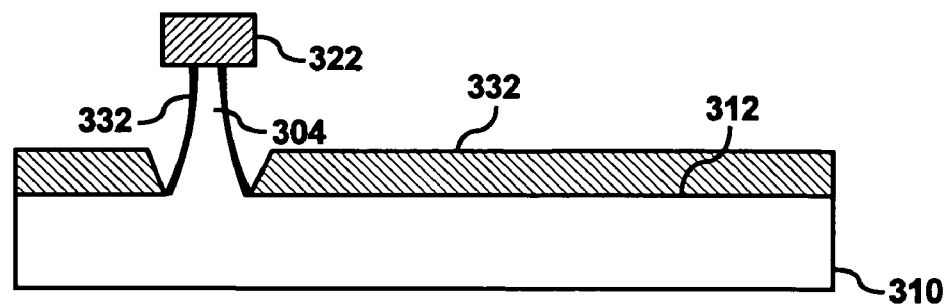
Figure 3D:
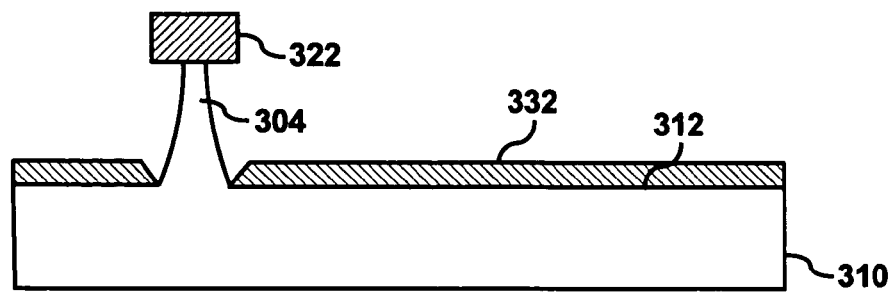
Figure 3E:
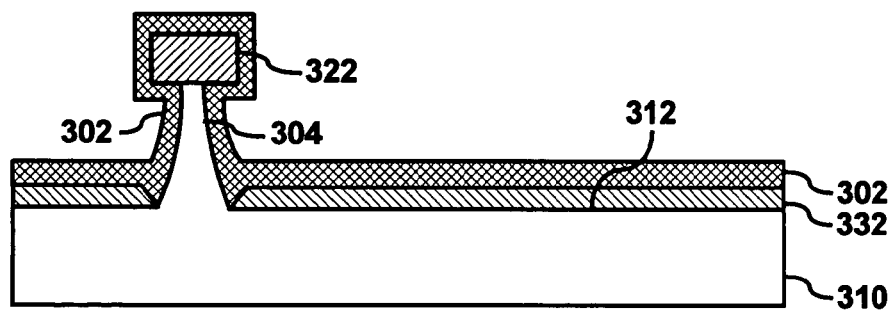
Figure 3F:
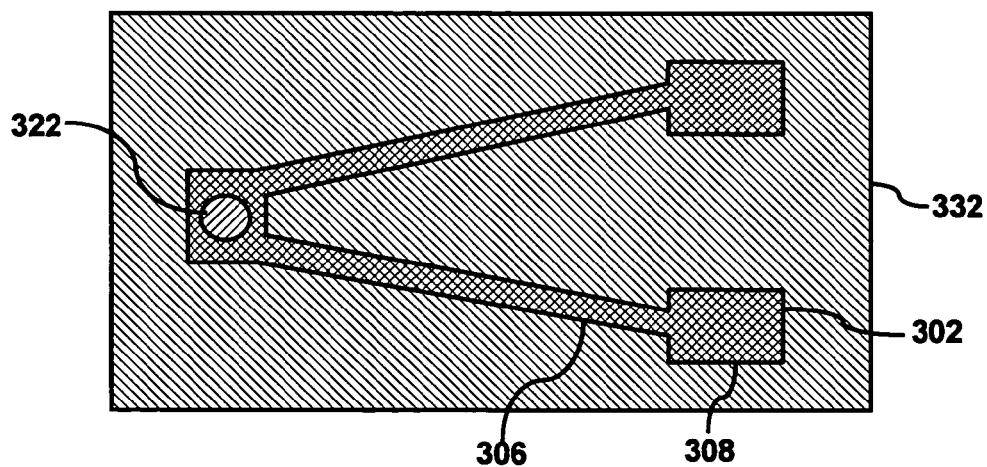
Figure 3G:
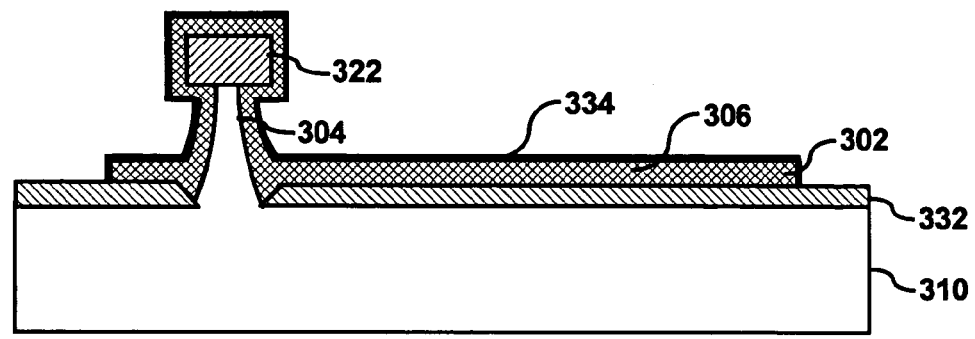
Figure 3H:
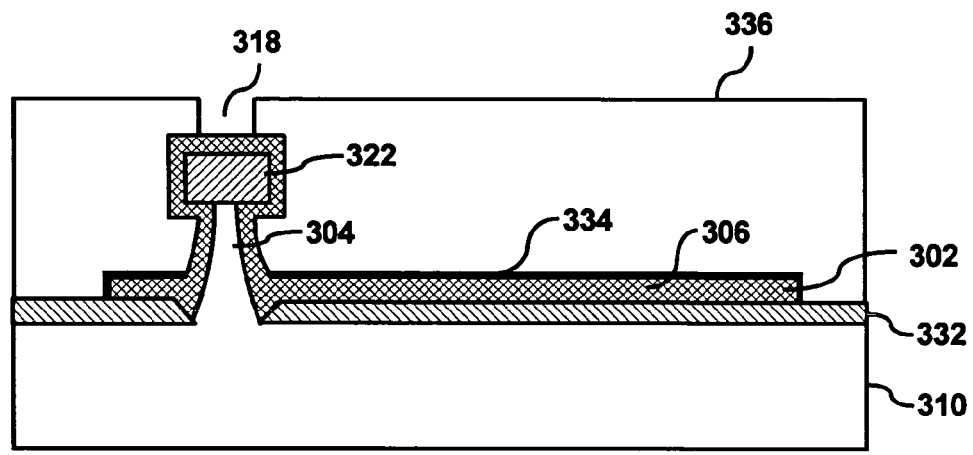
Figure 3I:
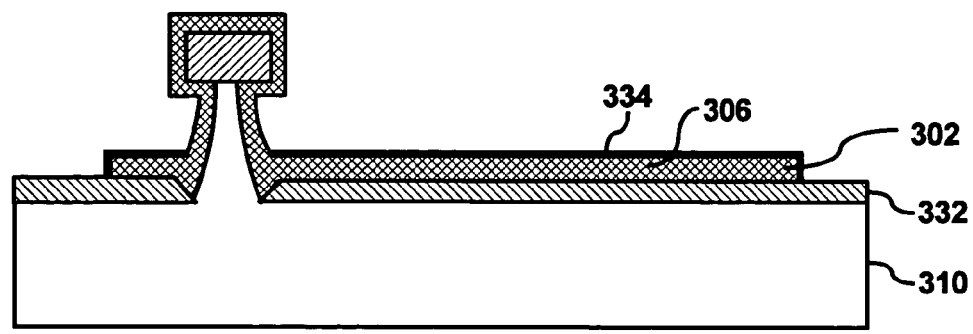
Figure 3J:
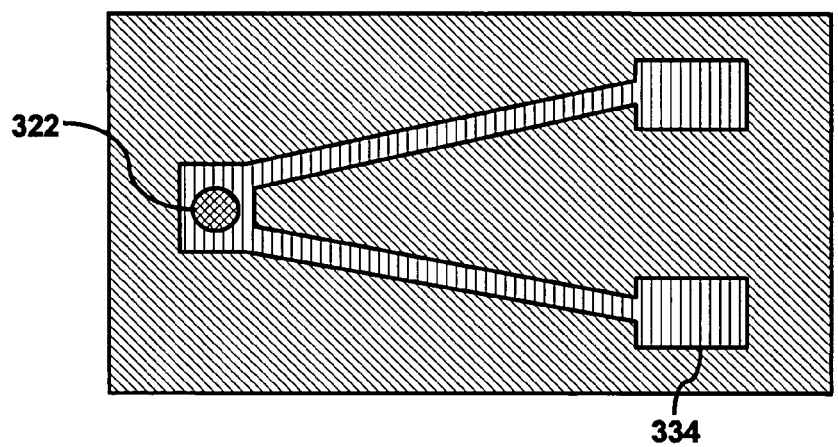
Figure 3K:
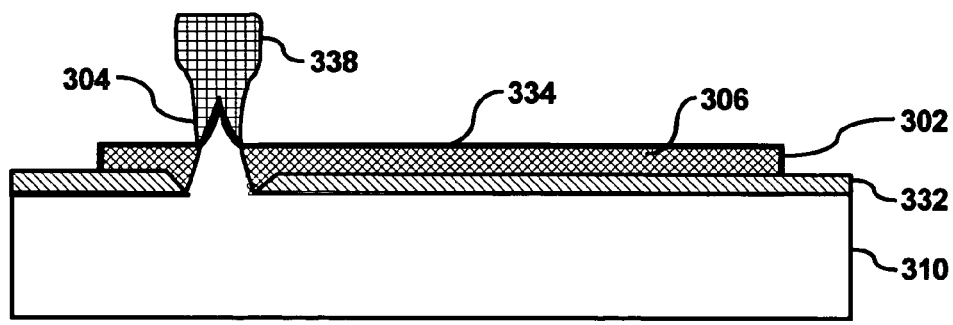
Figure 3L:
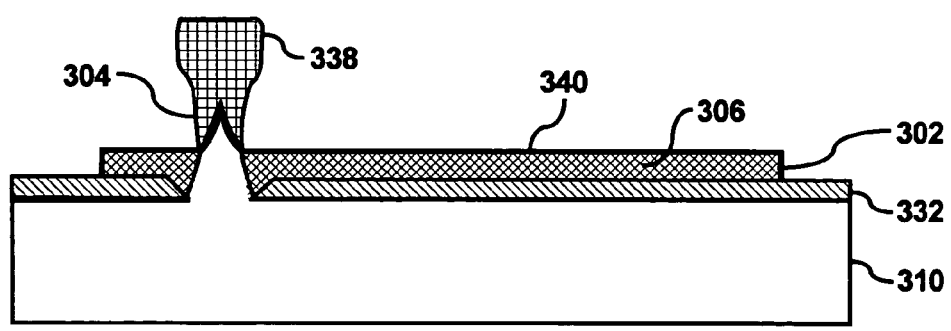
Figure 3M:
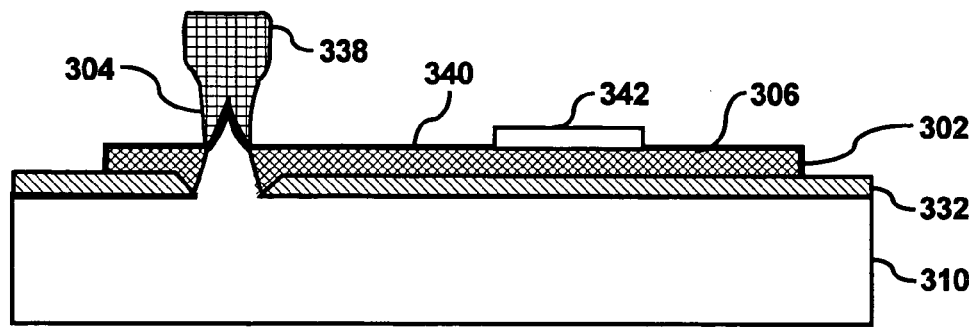
Figure 3N:
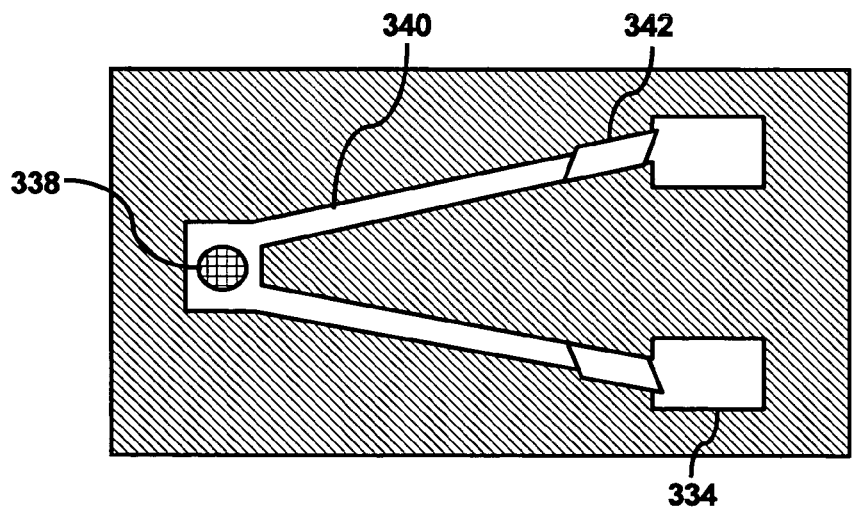
Figure 3O:
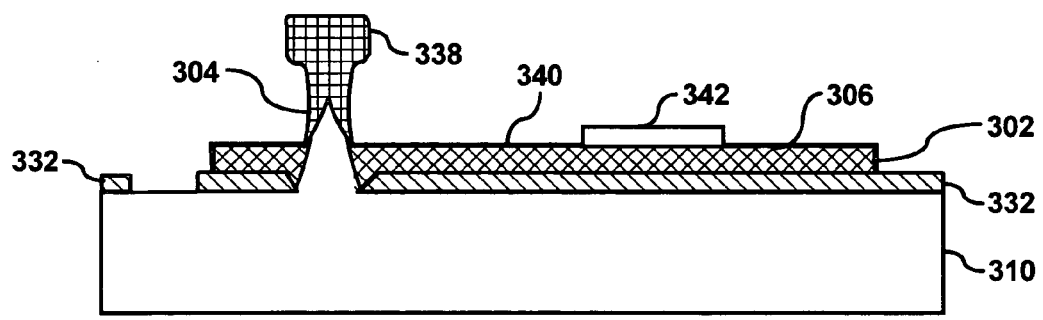
Figure 3P:
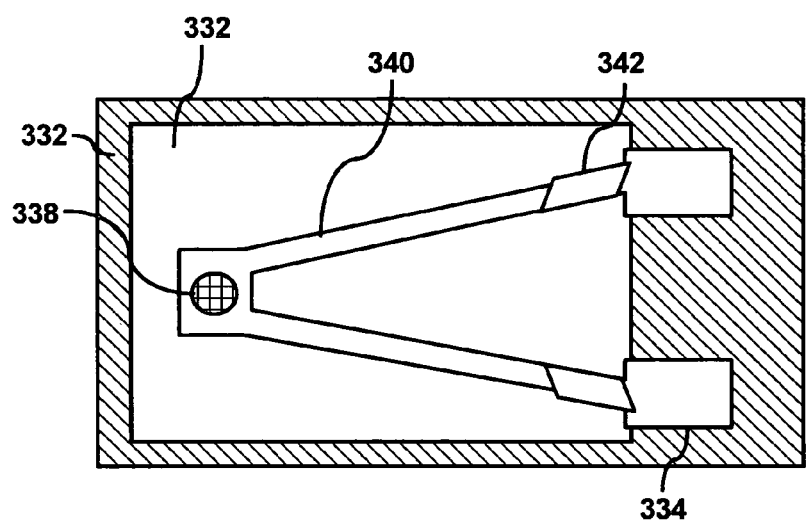
Figure 3Q:
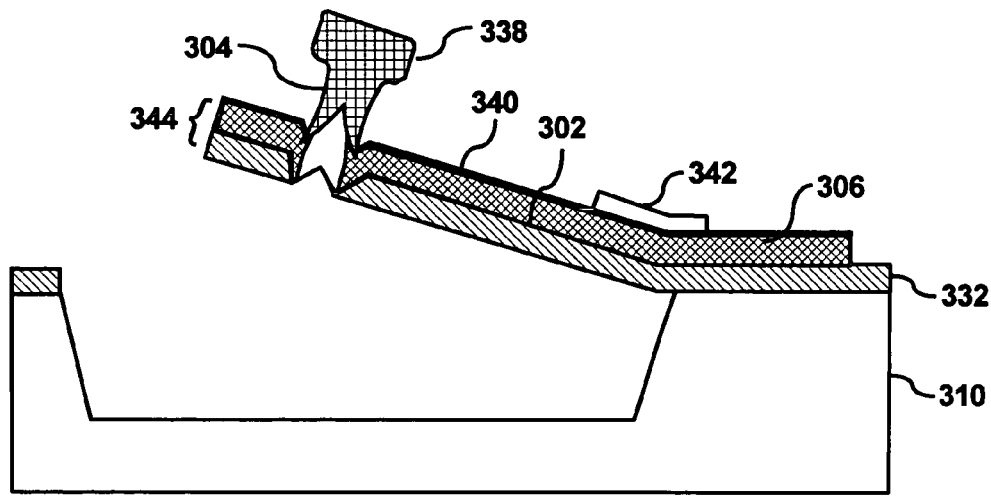
Figure 3R:
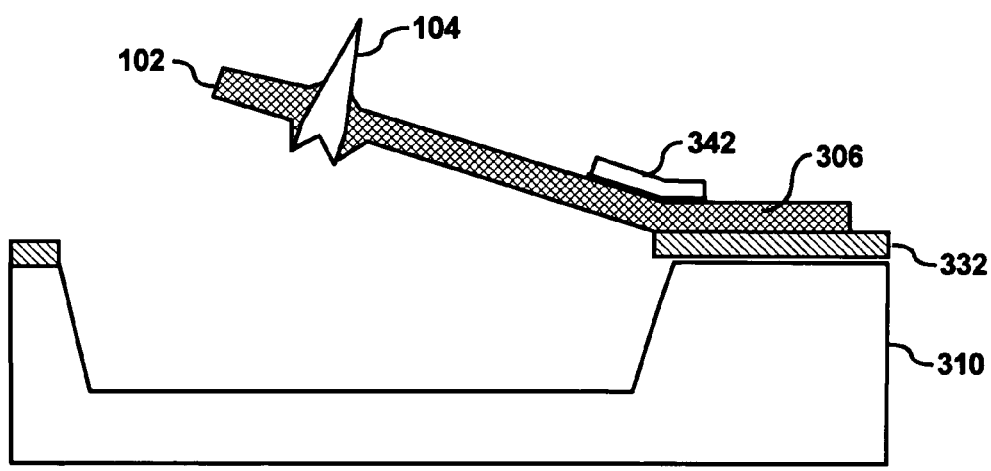

A more detailed description of the steps outlined with respect to the operational mode 200 depicted in FIG. 2A and the steps shown in FIGS. 3A-3R is set forth in FIG. 2B. As with FIG. 2A, FIG. 2B is a flow diagram illustrating an operational mode 250 of a method for forming a read/write mechanism. In addition, FIG. 2B makes particular reference to the elements depicted in FIGS. 3A-3R. It should, however, be understood that the operational mode 250 is not limited to the elements set forth in FIGS. 3A-3R. Instead, it should be understood that the operational mode 250 may be practiced in a different manner than that shown in FIGS. 3A-3R, and may produce a read/write mechanism having a different configuration than that set forth in FIGS. 1 and 3A-3R. It should also be understood that the order of the steps described in operational mode 250 may be performed in any order or simultaneously. For example, formation of the single crystal silicon tip 104 may be completed substantially simultaneously with the formation of the cantilever section 102.

The operational mode 250 is initiated by obtaining a starting material of a silicon wafer 310 having a field oxide ("FOX") layer 320 (FIG. 3A), at step 252.

At step 254, the silicon wafer 310 and the FOX layer 320 are etched to leave a substantially horizontal silicon section 312 and a silicon post 304 with a remaining portion 322 of the FOX layer 320 on top of the post 304, as shown in FIG. 3B. The etching process to produce the stage shown in FIG. 3B may include patterning photoresist over a section of the FOX layer 320 to leave the remaining portion 322 of the FOX layer 320, and performing an isotropic dry etch with a slight undercut to produce the silicon post 304. The dry etch may include, for example, a plasma etch.

At step 256, a first thin oxide layer 332 is deposited to cover the substantially horizontal section 312 and the sidewalls of the silicon post 304, as shown in FIG. 3C. As shown, the first thin oxide layer 332 is thicker on the substantially horizontal portion 312 than on the sidewalls of the silicon post 304. The first thin oxide layer may be sputter deposited using a physical vapor deposition ("PVD") process. In addition, the first thin oxide layer may be substantially anisotropic in structure so that the first thin oxide layer is thicker on the substantially horizontal portion 312 than on the sidewall of the silicon post 304.

At step 258, an isotropic etch process, such as a blank oxide etch, is then performed to etch back the first thin oxide layer 332 on the post 304 sidewalls, leaving the structure shown in FIG. 3D. The etch rate of the first thin oxide layer 332 on the substantially horizontal portion 312 is the same as the etch rate of the first thin oxide layer 332 on the post 304 sidewalls. Since the amount of the first thin oxide layer 332 is greater on the substantially horizontal portion 312, the first thin oxide layer 332 can be etched away from the sidewalls of the post 304 while a layer of the first thin oxide layer 332 remains on the substantially horizontal portion 312.

At step 260, a non-single crystal silicon layer 302 is deposited to cover the first thin oxide layer 332 on the substantially horizontal section 312 of the silicon wafer 210 and the silicon post 304, as shown in FIG. 3E. The non-single crystal silicon layer 302 may include an amorphous silicon or a poly-silicon, as discussed in greater detail above.

At step 262, the non-single crystal silicon layer 302 is patterned with photoresist and etched to define a cantilever shape 306, as shown in FIG. 3F. The etch process used to produce the stage illustrated in FIG. 3F may include, for instance, a photo-etch to etch away the non-single crystal silicon layer 302 from everywhere except under the photoresist. The photoresist is then stripped to leave a non-single crystal silicon layer 302 in the cantilever shape 306. The cantilever shape 306 may include one or more anchor sections 308 from which the cantilever to be formed may extend, which is described in greater detail hereinbelow.

At step 264, a nitride film 334 is deposited on the non-single crystal silicon layer 302 forming the cantilever shape 306, on the silicon post 304, and the remaining FOX layer 322, as shown in FIG. 3G. The nitride film 334 may include, for instance, a silicon nitride film.

At step 266, and as shown in FIG. 3H, a photoresist layer 336 is patterned with a small opening 318 aligned over the remaining FOX layer 322. The nitride film 334 is then etched away from the top and around the edges of the FOX layer 322 and from around the sidewalls of the silicon post 304. The etch process used to form the stage shown in FIG. 3H may include a strictly timed etch, including, for example, a plasma etch or a wet etch. The etch is timed to remove only the nitride film 334 from the top and edges of the FOX layer 322 and remove the nitride film 334 from the sidewalls of the silicon post 304.

At step 268, the photoresist layer 336 is stripped, as shown in FIG. 3I, leaving the nitride film 334 on the non-single crystal silicon layer 302 in the cantilever shape 306 portion. FIG. 3J illustrates a top view of the stage shown in FIG. 3I. As shown in FIG. 3J, the nitride film 334 covers the non-single crystal silicon layer 302 in the cantilever shape 306.

At step 270, the tip is sharpened as initially illustrated in FIG. 3K. More particularly, the silicon post 304 is oxidized to form a silicon post oxidation layer 338. The oxide layer 338 forms on the sidewalls of the silicon post 304 and the sidewalls and top of the remaining FOX layer 322. Little to no oxide growth occurs on or underneath the nitride film 334 because the nitride film 334 acts as a barrier for oxygen atoms. More particularly, the nitride film 334 generally prevents oxygen atoms from diffusing through the nitride film 334, thereby substantially preventing oxide formation on or underneath the nitride film 334.

At step 272, the remaining portion of the nitride film 334 is stripped and a second thin oxide layer 340 is deposited on the non-single crystal silicon layer 302, as shown in FIG. 3L.

At step 274, a tensile stress material 342, such as silicon nitride and the like, is deposited and patterned on a base section of the cantilever shape 306, as shown in FIG. 3M. FIG. 3N is a top view of the stage shown in FIG. 3M. As shown in FIG. 3N, the patterned tensile stress material 342 covers a section of the cantilever shape 306 adjacent to, and possibly overlapping, the anchor section of the cantilever shape 306. The tensile stress material 342 generally operates to tilt the cantilever shape 306 after a release process.

At step 276, the first thin oxide layer 332 is then patterned and etched to expose a portion of the silicon wafer 310, as shown in FIG. 3O. The first thin oxide layer 332 is etched away to leave an edge section of the first thin oxide layer 332 and a portion of the first thin oxide layer in the cantilever shape 306, as shown in FIG. 3P. The first thin oxide layer 332 may be etched using a chemical etch, such as Hydrofluoric acid (HF) and the like.

At step 278, the exposed portion of the silicon wafer 310 is then etched to form a cantilever section 344, as shown in FIG. 3Q. The silicon wafer 310 may be etched using a TMAH etch. The TMAH etch is an anisotropic etch, allowing the silicon below the cantilever section 344 to be etched so the cantilever shape 306 may be released. While the silicon wafer 310 is being etched, the etch of the single crystal silicon post 304 is self-terminating along with the (111) silicon crystal orientation. Depending upon the TMAH chemistries or the process temperature, the TMAH etch rate along the (100) silicon crystal orientation may be 50 times higher or more than the silicon etch rate along the (110) or the (111) silicon crystal orientation.

At step 280, and as shown in FIG. 3R, the first thin oxide layer 332 and the second thin oxide layer 340 are stripped to produce the non-single crystal silicon cantilever 102, and the silicon post oxidation layer 338 is stripped to produce the single crystal silicon tip 104. The first thin oxide layer 332, the second thin oxide layer 340 and the silicon post oxidation layer 338 are stripped using a chemical etch, such as, for example, a Hydrofluoric acid ("HF") chemical etch. The cantilever 102 may be removed from the remaining first thin oxide layer 332 to form the cantilever 102 illustrated in FIG. 1.

The operations set forth in the operational modes 200 and 250, and described in detail with respect to FIGS. 3A-3R, may be contained as a utility, program, or subprogram, in any desired computer accessible medium. In addition, the operational modes 200 and 250 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
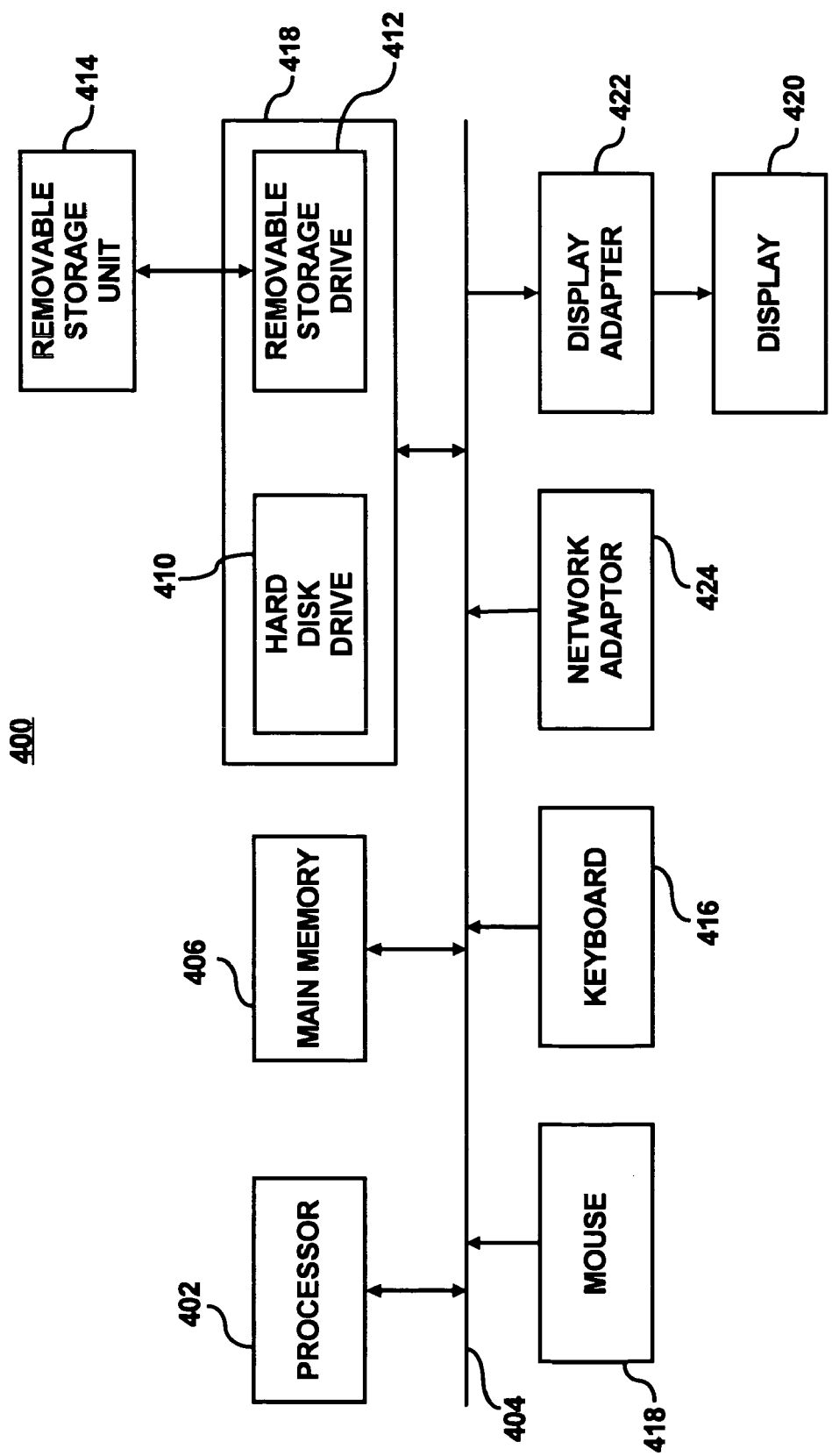
FIG. 4 illustrates a computer system configured to perform the steps outlined in FIGS. 2A and 2B, according to an embodiment of the invention.

FIG. 4 illustrates an exemplary computer system 400, according to an embodiment. The computer system 400 may include, for example, a computer system to control the read/write mechanism forming process described with respect to operational modes 200, 250 and FIGS. 3A-3R. In this respect, the computer system 400 may be used as a platform for executing one or more of the functions described hereinabove with respect to operational modes for the formation of the read/write mechanism 100.

The computer system 400 includes one or more controllers, such as a processor 402. The processor 402 may be used to execute some or all of the steps described in the operational modes 200, 250 and FIGS. 3A-3R. Commands and data from the processor 402 are communicated over a communication bus 404. The computer system 400 also includes a main memory 406, such as a random access memory (RAM), where a program code may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the provisioning system may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor 402 may communicate over a network, for instance, the Internet, LAN, etc., through a network adaptor 424.

It will be apparent to one of ordinary skill in the art that other known electronic components may be added or substituted in the computer system 400. In addition, the computer system 400 may include a system board or blade used in a rack in a data center, a conventional "white box" server or computing device, etc. Also, one or more of the components in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A system for forming a hybrid cantilever with a silicon wafer having a field oxide layer, the system comprising:

means for etching the silicon wafer on a top portion to leave a substantially horizontal silicon section and a silicon post with a remaining portion of the field oxide layer on top of the post;

means for section depositing a first thin oxide layer to cover the substantially horizontal section;

means for depositing a non-single crystal silicon layer to cover the thin oxide layer on the substantially horizontal section and the silicon post;

means for patterning the non-single crystal silicon layer to define a cantilever shape;

means for etching the non-single silicon layer to define the cantilever shape;

means for depositing a nitride film on the cantilever shape;

means for etching away to the nitride film along the top and sidewall of the silicon post to leave a remaining portion of the nitride film along a horizontal portion of the cantilever shape;

means for oxidizing the silicon post to form a silicon post oxidation layer;

means for stripping the remaining portion of the nitride film;

means for depositing a second thin oxide layer on the horizontal portion of the cantilever shape;

means for etching the first thin oxide layer to expose a portion of the silicon wafer leaving an edge section of the first thin oxide layer and a portion of the first thin oxide layer in the cantilever shape;

means for etching the exposed portion of the silicon wafer to form the cantilever; and means for stripping the first thin oxide layer and the second thin oxide layer, to produce a non-single crystal silicon cantilever, and the silicon cost oxidation layer, to produce a single silicon tip.

2. The system according to claim 1, further comprising:

means for depositing a tensile stress material on a base section of the cantilever shape; and means for patterning the tensile stress material on the base section of the cantilever shape.

3. The system according to claim 2, wherein the tensile stress material comprises silicon nitride.

4. The system according to claim 1, further comprising means for sharpening the single crystal silicon tip.

5. The system according to claim 1, wherein the non-single crystal silicon layer comprises at least one of polycrystalline silicon and amorphous silicon.

6. The system according to claim 1, wherein the means for etching the silicon wafer on a top portion to leave a substantially horizontal silicon section and a silicon post with a remaining portion of the field oxide layer on top of the post comprises means for patterning photoresist over a section of the field oxide layer and performing an isotropic dry etch with an undercut to produce the silicon post.

7. The system according to claim 1, wherein the means for depositing a first thin oxide layer to cover the substantially horizontal section comprises means for sputter depositing the first thin oxide layer using a physical vapor deposition process.

8. A method of forming a hybrid cantilever, the method comprising:

obtaining a silicon wafer having a field oxide layer;

etching the silicon wafer on a top portion to leave a substantially horizontal silicon section and a silicon post with a remaining portion of the field oxide layer on top of the post;

depositing a first thin oxide layer to cover the substantially horizontal section;

depositing a non-single crystal silicon layer to cover the thin oxide layer on the substantially horizontal section and the silicon post;

patterning the non-single crystal silicon layer to define a cantilever shape;

etching the non-single crystal silicon layer to define the cantilever shape;

depositing a nitride film on the cantilever shape;

etching away to nitride film along the top and sidewall of the silicon post to leave a remaining portion of the nitride film along a horizontal portion of the cantilever shape;

oxidizing the silicon post to form a silicon post oxidation layer;

stripping the remaining portion of the nitride film;

depositing a second thin oxide layer on the horizontal portion of the cantilever shape;

etching the first thin oxide layer to expose a portion of the silicon wafer leaving an edge section of the first thin oxide layer and a portion of the first thin oxide layer in the cantilever shape;

etching the exposed portion of the silicon wafer to form the cantilever; and stripping the first thin oxide layer and the second thin oxide layer, to produce a non-single crystal silicon cantilever, and the silicon post oxidation layer, to produce a single silicon tip.

9. The method according to claim 8, further comprising:

depositing a tensile stress material on a base section of the cantilever shape; and patterning the tensile stress material on the base section of the cantilever shape.

10. The method according to claim 9, wherein the tensile stress material comprises silicon nitride.

11. The method according to claim 8, wherein the non-single crystal silicon layer comprises at least one of polycrystalline silicon and amorphous silicon.

12. The method according to claim 8, wherein the step of etching the silicon wafer on a top portion to leave a substantially horizontal silicon section and a silicon post with a remaining portion of the field oxide layer on top of the post comprises patterning photoresist over a section of the field oxide layer and performing an isotropic dry etch with an undercut to produce the silicon post.

13. The method according to claim 8, wherein the step of depositing a first thin oxide layer to cover the substantially horizontal section comprises sputter depositing the first thin oxide layer using a physical vapor deposition process.

* * * * *

UNITED STATES PATENT AND TRADEMARK OFFICE
CERTIFICATE OF CORRECTION

PATENT NO. : 7,288,425 B2
APPLICATION NO. : 10/915571
DATED : October 30, 2007
INVENTOR(S) : Chien-Hua Chen et al.

It is certified that error appears in the above-identified patent and that said Letters Patent is hereby corrected as shown below:

In column 6, line 56, in Claim 1, after "for" delete "section".

In column 6, line 64, in Claim 1, before "silicon" insert -- crystal --.

In column 7, line 1, in Claim 1, after "away" delete "to".

In column 7, line 19, in Claim 1, delete "cost" and insert -- post --, therefor.

In column 8, line 10, in Claim 8, after "away" delete "to" and insert -- the --, therefor.

Signed and Sealed this

First Day of September, 2009

David J. Kappos
*Director of the United States Patent and Trademark Office*